United States Patent

Shimada et al.

(10) Patent No.: US 12,001,901 B2
(45) Date of Patent: Jun. 4, 2024

(54) INKJET RECORDING APPARATUS AND INKJET RECORDING METHOD

(71) Applicant: CANON KABUSHIKI KAISHA, Tokyo (JP)

(72) Inventors: Naoki Shimada, Kanagawa (JP); Yuto Kajiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/182,658

(22) Filed: Mar. 13, 2023

(65) Prior Publication Data

US 2023/0294433 A1    Sep. 21, 2023

(30) Foreign Application Priority Data

Mar. 18, 2022   (JP) .................. 2022-043942

(51) Int. Cl.
*G06K 15/10*    (2006.01)
*B41J 3/01*    (2006.01)

(52) U.S. Cl.
CPC .............. *G06K 15/107* (2013.01); *B41J 3/01* (2013.01)

(58) Field of Classification Search
CPC ........ G06K 15/105; G06K 15/107; B41J 3/01
See application file for complete search history.

(56) References Cited

U.S. PATENT DOCUMENTS

2003/0048460 A1*   3/2003   Vinals-Matas ....... G06K 15/102
                                                            358/1.8

FOREIGN PATENT DOCUMENTS

JP           2000198237 A        7/2000

* cited by examiner

*Primary Examiner* — Julian D Huffman
(74) *Attorney, Agent, or Firm* — Canon U.S.A., Inc. IP Division

(57) ABSTRACT

To prevent shifts in the landing positions of ink in edge regions, two adjacent nozzles to which ink is supplied from a common liquid chamber are restricted from simultaneously discharging ink.

12 Claims, 22 Drawing Sheets

FIG. 7A
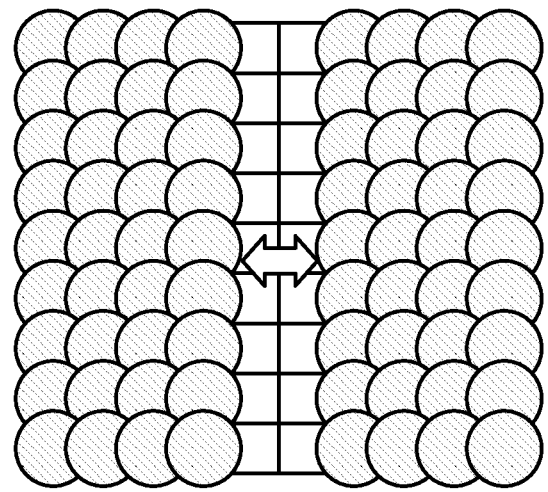
FIG. 7B
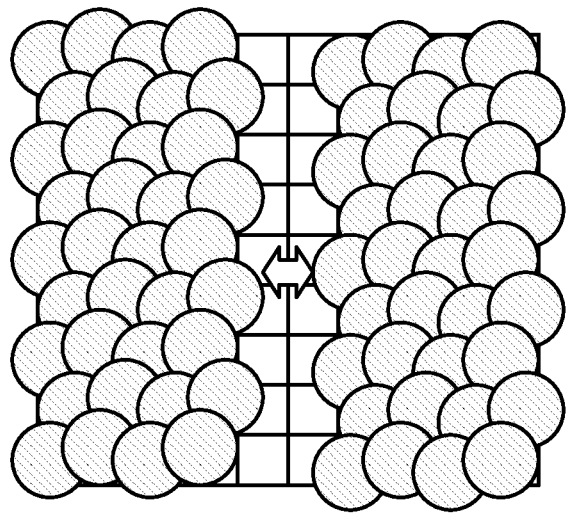
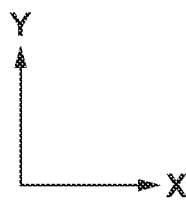

FIG. 8A

|  | NON-EDGE REGION | | EDGE REGION | |
|---|---|---|---|---|
|  | PATTERN A | PATTERN B | PATTERN A | PATTERN B |
| NON-RECORDING "0" | 0 dot | 0 dot | 0 dot | 0 dot |
| RECORDING "1" | 1 dot | 1 dot | 1 dot | 0 dot |

FIG. 8B

| A | A | A | A | A | A |
|---|---|---|---|---|---|
| B | B | B | B | B | B |
| A | A | A | A | A | A |
| B | B | B | B | B | B |
| A | A | A | A | A | A |
| B | B | B | B | B | B |

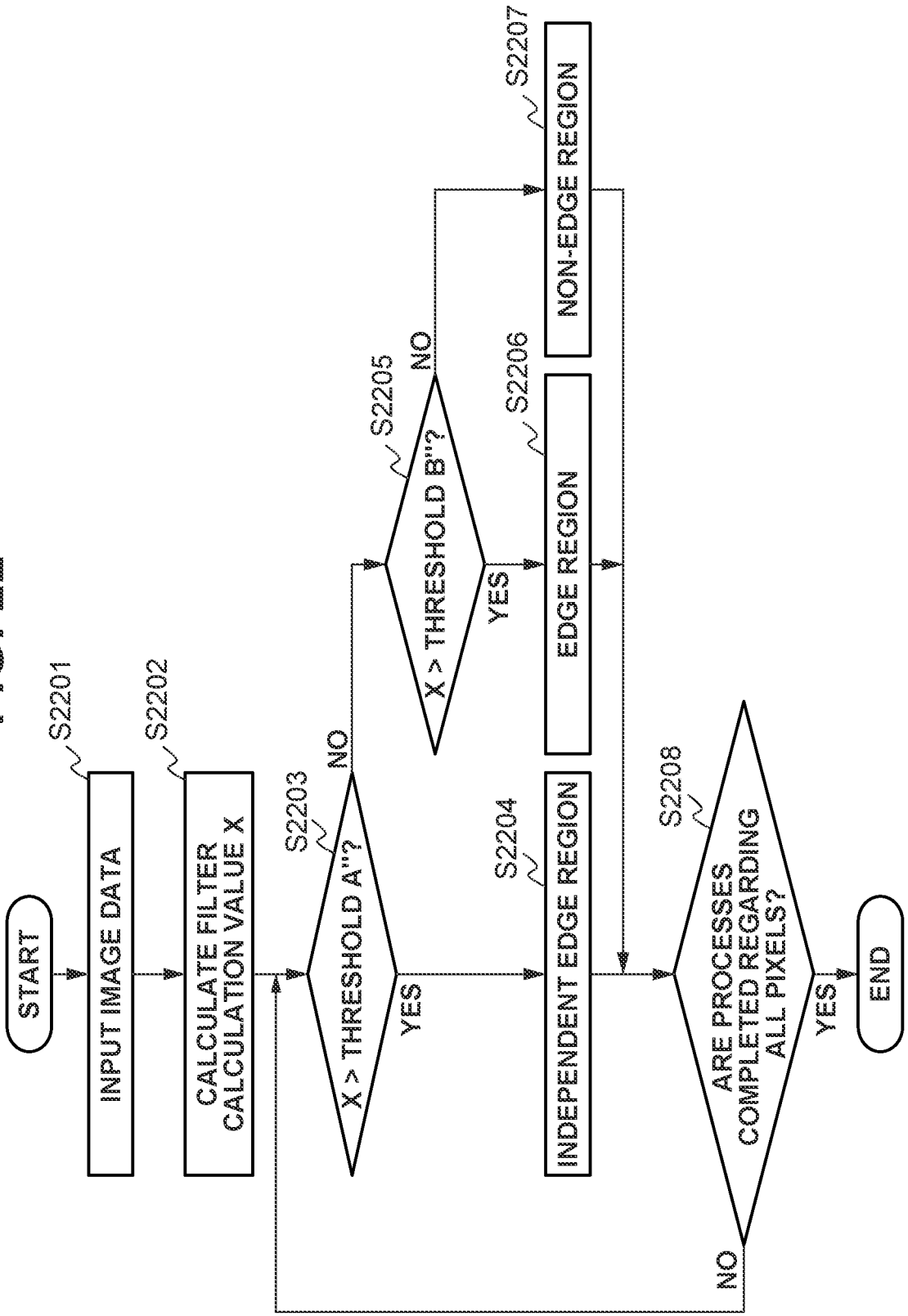

INKJET RECORDING APPARATUS AND INKJET RECORDING METHOD

BACKGROUND

Field of the Disclosure

The present disclosure relates to an inkjet recording apparatus that records an image on a recording medium, and an inkjet recording method.

Description of the Related Art

An inkjet recording apparatus performs control to repeatedly perform conveyance of a recording medium and scanning with a carriage, on which a recording head is mounted, thereby recording an image on the recording medium.

Japanese Patent Application Laid-Open No. 2000-198237 discusses a technique for changing a dot of a large size to a dot of a small size to smooth a contour portion of a character or a figure when an image is recorded.

SUMMARY

According to embodiments of the present disclosure, an inkjet recording apparatus includes a recording unit in which a plurality of nozzles for discharging ink supplied from a common liquid chamber is arranged in a first direction, a scan unit configured to perform a relative scan relative to a recording medium in a second direction intersecting the first direction, and an acquisition unit configured to acquire image data including at least one recording target, wherein, in a case where a width in the second direction of the recording target is a first number of pixels, the recording unit performs recording using a first nozzle but not a second nozzle adjacent to the first nozzle in the first direction in a single relative scan in an edge region of the recording target, and wherein, in a case where the width in the second direction of the recording target is a second number of pixels smaller than the first number of pixels, the recording unit performs recording using the first and second nozzles in the single relative scan in the edge region of the recording target.

Further features of the present disclosure will become apparent from the following description of exemplary embodiments with reference to the attached drawings.

BRIEF DESCRIPTION OF THE DRAWINGS

FIGS. 7A and 7B are diagrams illustrating a barcode in a case where landing accuracy of ink decreases.

FIGS. 8A and 8B are diagrams illustrating an example where the number of ink droplets is assigned to binary data.

FIG. 22 is a specific flowchart of an edge detection process according to a third exemplary embodiment.

DESCRIPTION OF THE EMBODIMENTS

With reference to the drawings, exemplary embodiments of the present disclosure will be described below. While the following description is given on the assumption of image processing in an inkjet printer main body, this merely illustrates an exemplary embodiment as an example, and the present disclosure is not limited to the following configuration.

Inkjet Recording Apparatus

Figure 1:
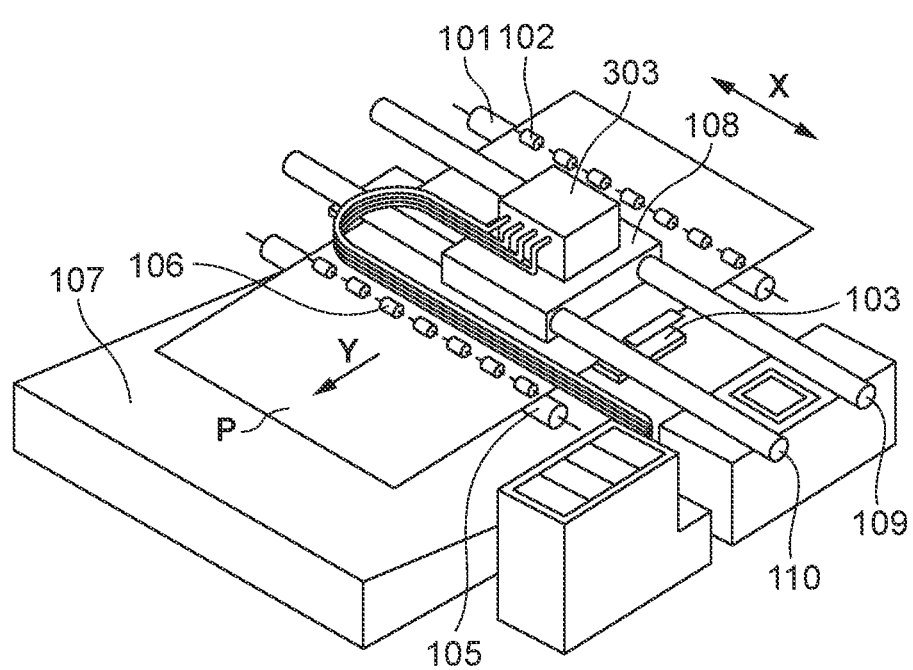
FIG. 1 is a diagram schematically illustrating an inkjet printer.

FIG. 1 is a diagram illustrating a recording apparatus according to a first exemplary embodiment. The recording apparatus according to the present exemplary embodiment is an inkjet printer using what is called a serial recording method and executes multipass recording for completing the recording of an image in a unit area by performing multiple relative scans of a recording head 303 relative to a recording medium P.

The recording medium P fed to a recording unit is conveyed by a nip portion formed by a conveying roller 101 placed on a conveying path and pinch rollers 102 driven by the conveying roller 101, in the direction of an arrow Y in FIG. 1 (a sub-scanning direction) with the rotation of the conveying roller 101. A platen 103 is provided at a position opposed to a discharge port surface where discharge ports (nozzles) are formed of the recording head 303 using an inkjet recording method. Then, the platen 103 supports the back side of the recording medium P from below, thereby maintaining a constant distance between the front side of the recording medium P and the discharge port surface of the recording head 303. The recording medium P on which an image is recorded is conveyed in the direction of the arrow Y with the rotation of a discharge roller 105 while being nipped by the discharge roller 105 and spurs 106 driven by the discharge roller 105, and is discharged to a sheet discharge tray 107.

The recording head 303 is detachably mounted on a carriage 108 in the orientation in which the discharge port surface faces the platen 103 or the recording medium P. The carriage 108 reciprocates in the direction of an arrow X along two guide rails 109 and 110 by the driving force of a carriage motor. In a process of the reciprocation, the recording head 303 executes a discharge operation to discharge ink droplets from discharge ports in response to a recording signal, thereby applying ink to the recording medium P.

Figure 2:
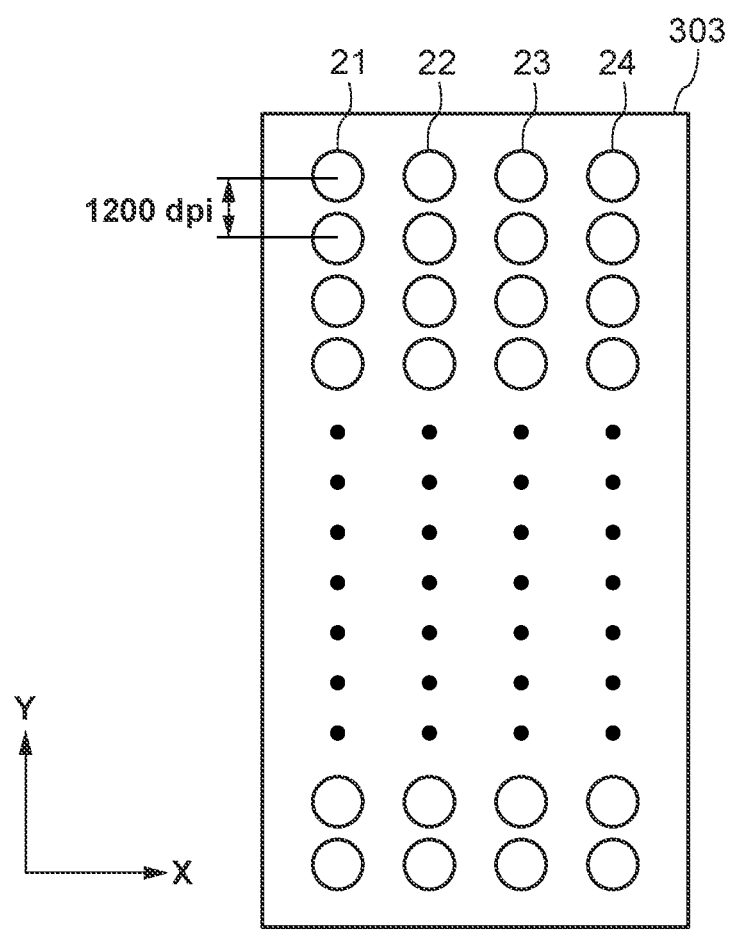
FIG. 2 is a schematic diagram illustrating a case where a recording head is observed from a nozzle formation surface.

FIG. 2 is a schematic diagram illustrating a case where the recording head 303 is observed from the discharge port surface side. In the present exemplary embodiment, a cyan nozzle column 21, a magenta nozzle column 22, a yellow nozzle column 23, and a black nozzle column 24 are arranged in an X-direction as illustrated in FIG. 2. In each of the nozzle columns, discharge ports (nozzles) for discharging ink are placed at regular intervals in a Y-direction.

Within each discharge port, a recording element (not illustrated) is provided. The recording element is driven by electrical energy, thereby generating thermal energy. The thermal energy causes ink to foam, and as a result, the ink is discharged as a droplet from the discharge port. In the following description, for simplicity, a column of a plurality of discharge ports that discharges ink of the same color and the same amount is referred to as a "nozzle column".

The X-direction in which the carriage 108 moves is a direction intersecting the Y-direction in which the recording medium P is conveyed, and is termed a "main scanning direction". On the other hand, the Y-direction in which the recording medium P is conveyed is termed a "sub-scanning direction". Then, the movement involving recording, which is main scanning, of the carriage 108 and the recording head 303 and the conveyance (sub-scanning) of the recording medium P are alternately repeated, thereby multipass recording for forming an image step by step is performed on the recording medium P.

Figure 14:
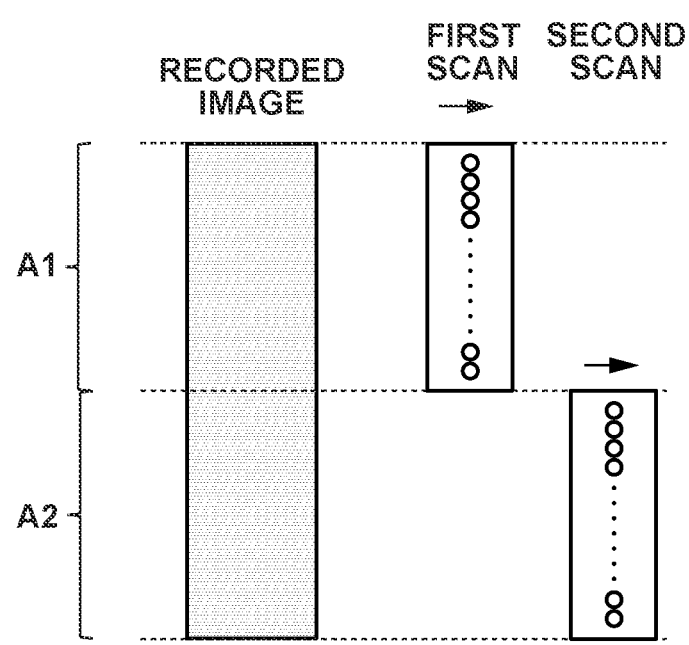
FIG. 14 is a diagram illustrating an example of a recording operation in multipass scanning.

FIG. 14 is a diagram illustrating relationships between the recording medium P and nozzles (discharge ports) used to record an image when the multipass recording is performed. While the description is given taking the black nozzle column 24 as an example, the same applies to other nozzle columns.

First, in a first scan, forward recording that records an image in a region A1 using all the nozzles while moving the recording head 303 together with the carriage 108 in a +X-direction (a forward direction) is executed. After the first scan, the recording medium P is conveyed in a +Y-direction. A conveyance amount at this time is a length corresponding to all the nozzles. Then, after the recording head 303 is returned together with the carriage 108 in a −X-direction, forward recording by a second scan is executed. In the second scan, an image is recorded in a region A2 using all the nozzles while moving the recording head 303 together with the carriage 108 in the +X-direction again. After the second scan, the recording medium P is conveyed in the +Y-direction. The conveyance amount at this time is also the length corresponding to all the nozzles. Then, the recording medium P is discharged in the +Y-direction, and the recording operation end.

As described above, a recording method according to the present exemplary embodiment is a one-pass one-direction recording method for completing an image in a predetermined region (A1 or A2) on the recording medium P by a single scan in one direction of the recording head 303.

In the above-described example, after the first scan in the +X-direction, the recording head 303 is returned by a scan in the −X-direction that does not involve a recording operation, and the second scan in the +X-direction is performed. Alternatively, a form may be employed in which the scan in the −X-direction is a second scan involving the recording operation. More specifically, after the first scan, the carriage 108 and the recording head 303 are not returned in the −X-direction, and the recording medium P is conveyed by the length corresponding to all the nozzles in the +Y-direction. Then, in the second scan in the −X-direction, the image is recorded in the region A2 using all the nozzles.

Figure 3:
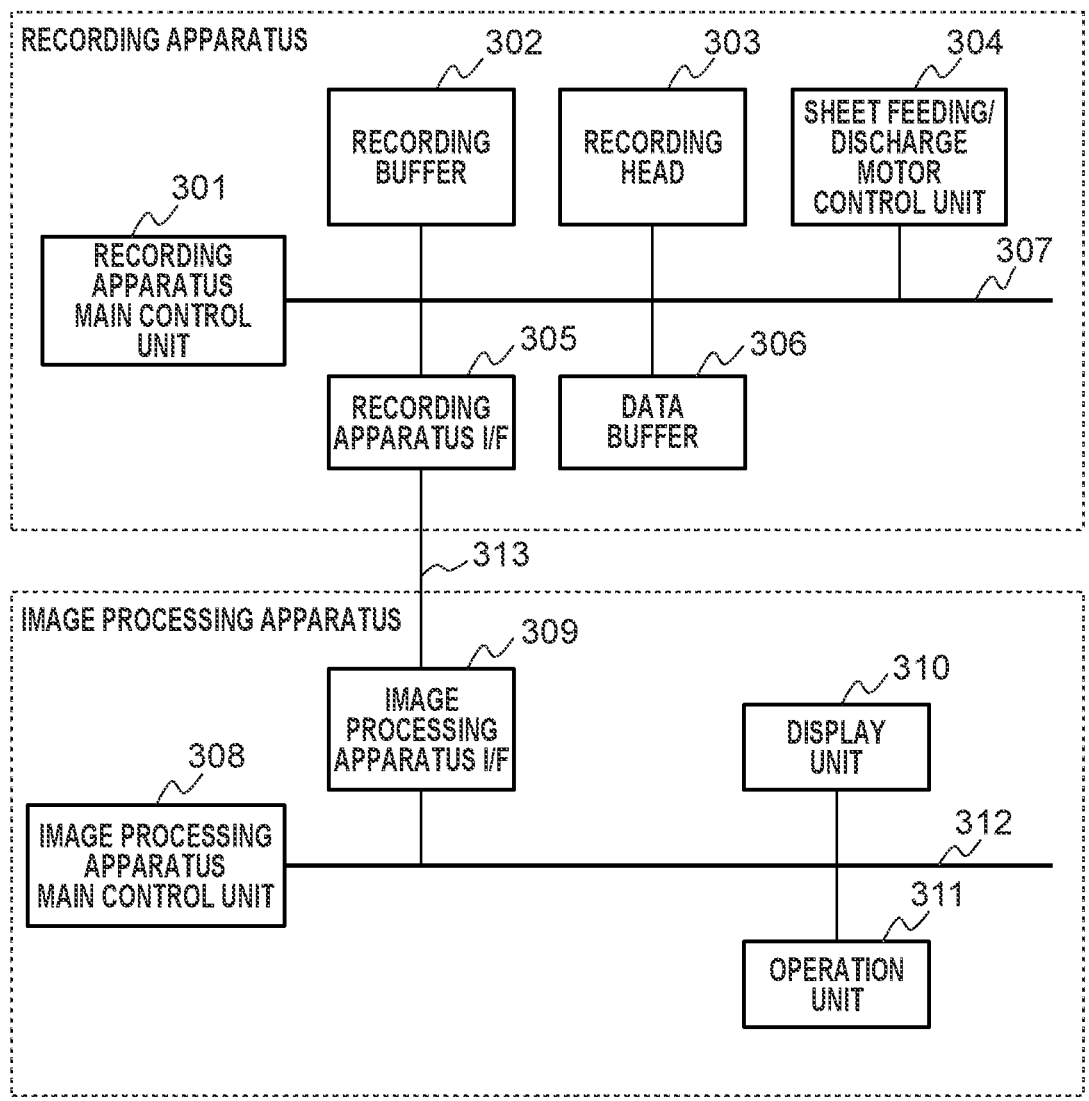
FIG. 3 is a block diagram illustrating a control configuration of an inkjet recording system.

FIG. 3 is a block diagram illustrating the control configuration of an inkjet recording system according to the present exemplary embodiment. A recording apparatus main control unit 301 controls the entirety of the recording apparatus and includes a central processing unit (CPU), a read-only memory (ROM), and a random-access memory (RAM). A recording buffer 302 stores image data before being transferred to the recording head 303 as raster data. The recording head 303 is a recording head using an inkjet recording method and including a plurality of nozzles capable of discharging ink droplets, and discharges ink from the nozzles based on the image data stored in the recording buffer 302. A sheet feeding/discharge motor control unit 304 controls conveyance, feeding, and discharge of a recording medium. A recording apparatus interface (I/F) 305 is connected to an image processing apparatus via an I/F signal line 313 and transmits and receives a data signal to and from the image processing apparatus. A data buffer 306 temporarily stores image data received from the image processing apparatus. A system bus 307 is a bus that connects the functional units of the recording apparatus.

An image processing apparatus main control unit 308 mainly creates an image and controls image data in the image processing apparatus and includes a CPU, a ROM, and a RAM. An image processing apparatus I/F 309 transmits and receives a data signal to and from the recording apparatus. A display unit 310 displays various pieces of information to a user. For example, a liquid crystal display (LCD) can be applied to the display unit 310. An operation unit 311 is an operation unit that receives an operation and an instruction from the user. For example, a keyboard and a mouse can be applied to the operation unit 311. A system bus 312 is a bus that connects the image processing apparatus main control unit 308 with the functional units of the image processing apparatus.

Overview of Recording System

Figure 4:
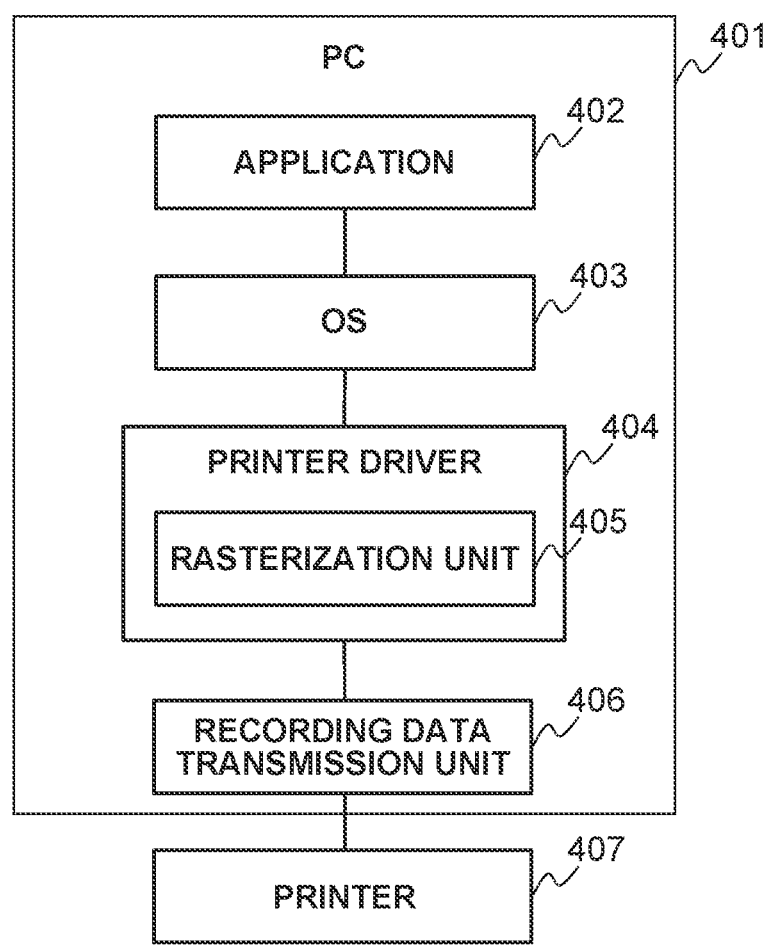
FIG. 4 is a block diagram illustrating an overview of the recording system.

FIG. 4 is a block diagram illustrating an overview of the recording system according to the present exemplary embodiment. The recording system illustrated in FIG. 4 includes a personal computer (PC) 401 as a host, and a recording apparatus (printer) 407 that records an image based on recording data transmitted from the PC 401. The PC 401 includes an application 402, an operating system (OS) 403, a printer driver 404, and a recording data transmission unit 406. The present exemplary embodiment is described below using recording data including an image of a barcode as an example of recording data sent to the printer 407. While the description is given using a barcode image as an example of a recording target, the present disclosure is not limited to the recording data including the image of a barcode. Recording data including an object such as a character, a line, or a photograph as the recording target may be employed.

The application 402 is an application that enables insertion of barcode data into an image. According to an instruction from the printer driver 404, the application 402 converts data obtained by the application 402 into recording data using a function necessary for image processing provided by the OS 403.

The printer driver 404 causes a rasterization unit 405 to rasterize (bitmap) the received recording data into an image having a resolution suitable for the recording head 303, thereby converting the received recording data into recording data in a format that can be received by the printer 407. The converted recording data is sent to the recording data transmission unit 406 and transmitted to the printer 407.

Next, a description is given of a process up to sending of a predetermined character string as barcode data to the printer 407 in the recording system according to the present exemplary embodiment. Barcode data is image data including what is called a barcode composed of a combination of bars and spaces. Then, a barcode image is generated by conversion of a predetermined character string into a format composed of bars and spaces using a barcode font.

If a character string is input to the application 402, the application 402 calls the printer driver 404 via the OS 403. Then, the application 402 requests barcode font information stored in the printer driver 404, and the user sets a specified barcode font.

The barcode font information includes information such as the name of a barcode font selected from a plurality of barcode types registered in advance, and the height and the width of the barcode font. Examples of the barcode font include Japanese Article Number (JAN) code, Code 39, and Code 128. Then, the application 402 sends setting values of the barcode font and image data together to the printer driver 404 via the OS 403.

Then, the rasterization unit 405 rasterizes the character string into barcode data composed of the combination of one-dimensional bars and spaces, using the specified barcode font. The rasterized data is converted into recording data in a format that can be received by the printer 407. Then, the recording data is transmitted to the printer 407 via the recording data transmission unit 406.

While in the present exemplary embodiment, the description has been given of the configuration of a form in which the application calls the barcode font in the printer driver via the OS, the present disclosure is not limited thereto.

Description of Overview of Overall Procedure

Figure 5:
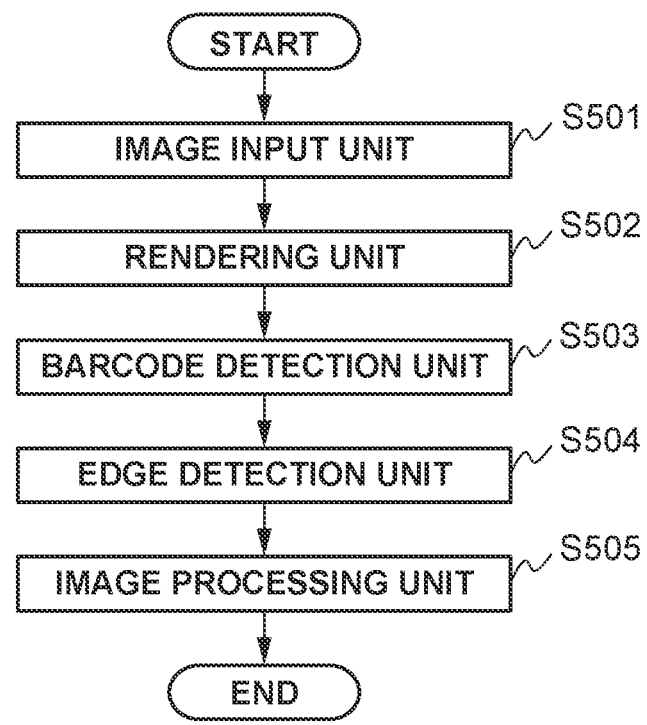
FIG. 5 is a flowchart of image data processing performed by an image processing apparatus.

FIG. 5 is a flowchart illustrating processing on image data performed by the image processing apparatus according to the present exemplary embodiment. The processing illustrated in FIG. 5 may be performed by the PC 401 that is the host, or may be performed in the printer 407, or a form may be employed in which the processing is executed in a partially shared manner.

In step S501, image data is input. The input image data may be vector data, or may be bitmap data.

In step S502, the input image data is subjected to a rendering process, whereby the vector data is rasterized. In this step, mapping or imposition may be performed to fit the size of a recording medium on which an image is to be recorded.

Pixel data corresponding to pixels in a single column arranged in a predetermined direction among pixels arranged in a matrix is referred to as "raster data". Further, a plurality of arranged columns of pixels is referred to as "band data". In a case where the printer 407 performs image processing on the raster data or the band data, the data may be processed with a small ROM or RAM capacity. However, a configuration is often employed in which the band data is sequentially processed.

In step S503, a barcode detection unit detects a barcode region. In this step, the position of the detected barcode is acquired. Barcode data may be formed by a method for rasterizing the barcode using a barcode font, or may be formed as bitmap data or vector data from the start. Thus, the barcode data may be acquired in the rendering in step S502, or may be detected from edge information after the barcode is bitmapped. There is also a method in which the user specifies the barcode data on a panel or on the host side. The method for forming the barcode data is not limited in the present exemplary embodiment.

In step S504, an edge detection unit detects edge information regarding a bar included in the barcode. In this step, as the edge information, information regarding pixels corresponding to an edge region of the bar and pixels corresponding to a non-edge region that is a region inside the edge is detected. Then, using the position information regarding the barcode acquired in step S503 and the detected edge information, control over the edge region of the barcode is executed. The edge detection process can be performed using a known technique such as a Sobel filter or a Laplacian filter.

Figure 15:
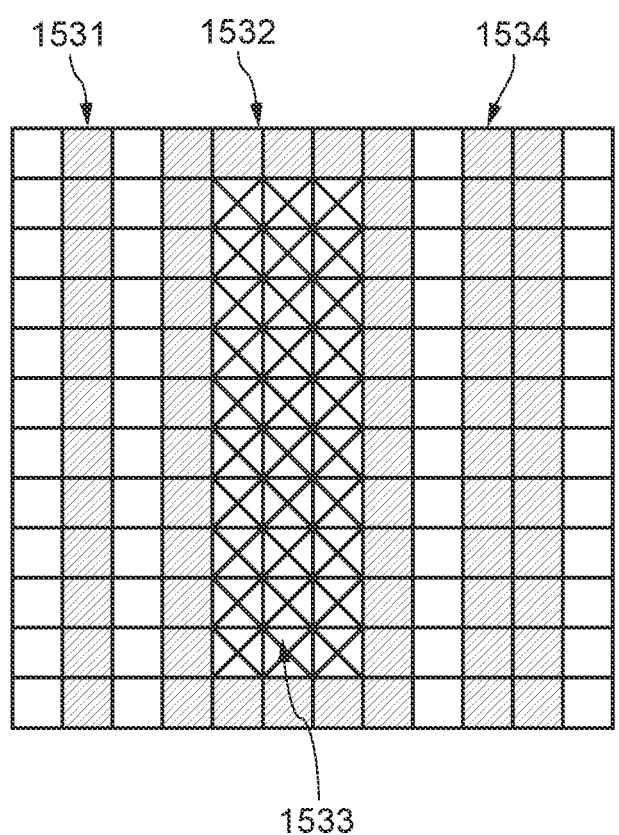
FIG. 15 is a diagram illustrating an edge detection process.

FIG. 15 is a diagram illustrating the edge detection process and illustrates a state where edges are detected by the edge detection unit. FIG. 15 illustrates an example of an image including three recording targets. The image includes a one-pixel width line, a five-pixel width line, and a two-pixel width line from the left. In the present exemplary embodiment, an independent edge region 1531, edge regions 1532 and 1534, and a non-edge region 1533 are set. A "non-edge region" refers to a region contained in an edge region. Among regions detected by the edge detection process, a region having short sides that are one pixel, i.e., a one-pixel width region, is referred to as an "independent edge region". While the details will be described below, in the present exemplary embodiment, different types of discharge control are performed over an edge region and a non-edge region, and discharge control similar to that over the non-edge region is performed over an independent edge region.

FIGS. 16A to 16D are diagrams illustrating the process of detecting an edge region by a filter process.

Figure 16:
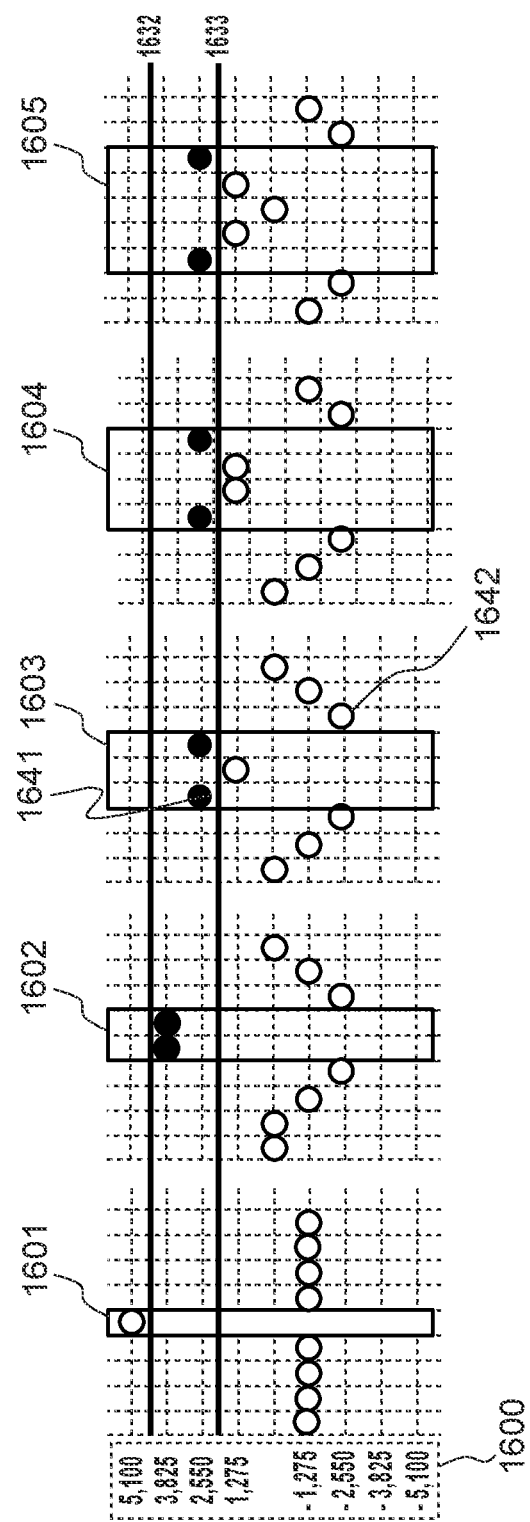
FIGS. 16A, 16B, 16C, and 16D are diagrams illustrating a determination process for determining an edge region by a filter process.

FIG. 16A illustrates input image data. FIG. 16A illustrates an image of a vertical ruled line having a one-pixel width in the horizontal direction. FIG. 16B illustrates an edge detection filter. FIG. 16C illustrates a result of calculation using the edge detection filter. FIG. 16D illustrates a diagram plotting the result of calculation using the filter on a vertical axis 1600. FIG. 16D illustrates the results of calculation using the filter in FIG. 16B regarding a one-pixel width vertical ruled line 1601, a two-pixel width vertical ruled line 1602, a three-pixel width vertical ruled line 1603, a four-pixel width vertical ruled line 1604, and a five-pixel width vertical ruled line 1605. The result of calculation using the filter differs depending on the width of the ruled line. For example, the result of calculation of the one-pixel width vertical ruled line 1601 is 5100.

While the details will be described below, in the present exemplary embodiment, different types of discharge control are performed over an edge region and a non-edge region.

Normally, a one-pixel width ruled line is detected as the edge region. In the present exemplary embodiment, however, discharge control similar to that over the non-edge region needs to be performed over the one-pixel width ruled line. To this end, the result of calculation using the filter is used as a method for detecting a one-pixel width ruled line distinctively from another edge region.

As illustrated in FIG. 16D, the result of calculation using the filter is a value depending on the line width. Thresholds 1632 and 1633 are set, and a pixel in a range between the thresholds 1632 and 1633 is detected as the edge region, whereby it is possible to prevent a one-pixel line width from being detected as the edge region. A black circle 1641 indicates a pixel determined as the edge region. A white circle 1642 indicates a pixel determined as the non-edge region.

The above-described edge detection process may be performed on the entire region of the input image data, or may be performed only on the detected barcode region. While the following description is given on the assumption of the process performed on an edge region included in a barcode, this merely illustrates an exemplary embodiment as an example, and the present disclosure is not limited to a barcode image. It is also possible to obtain a similar effect in an edge region of a line or a character.

Figure 18:
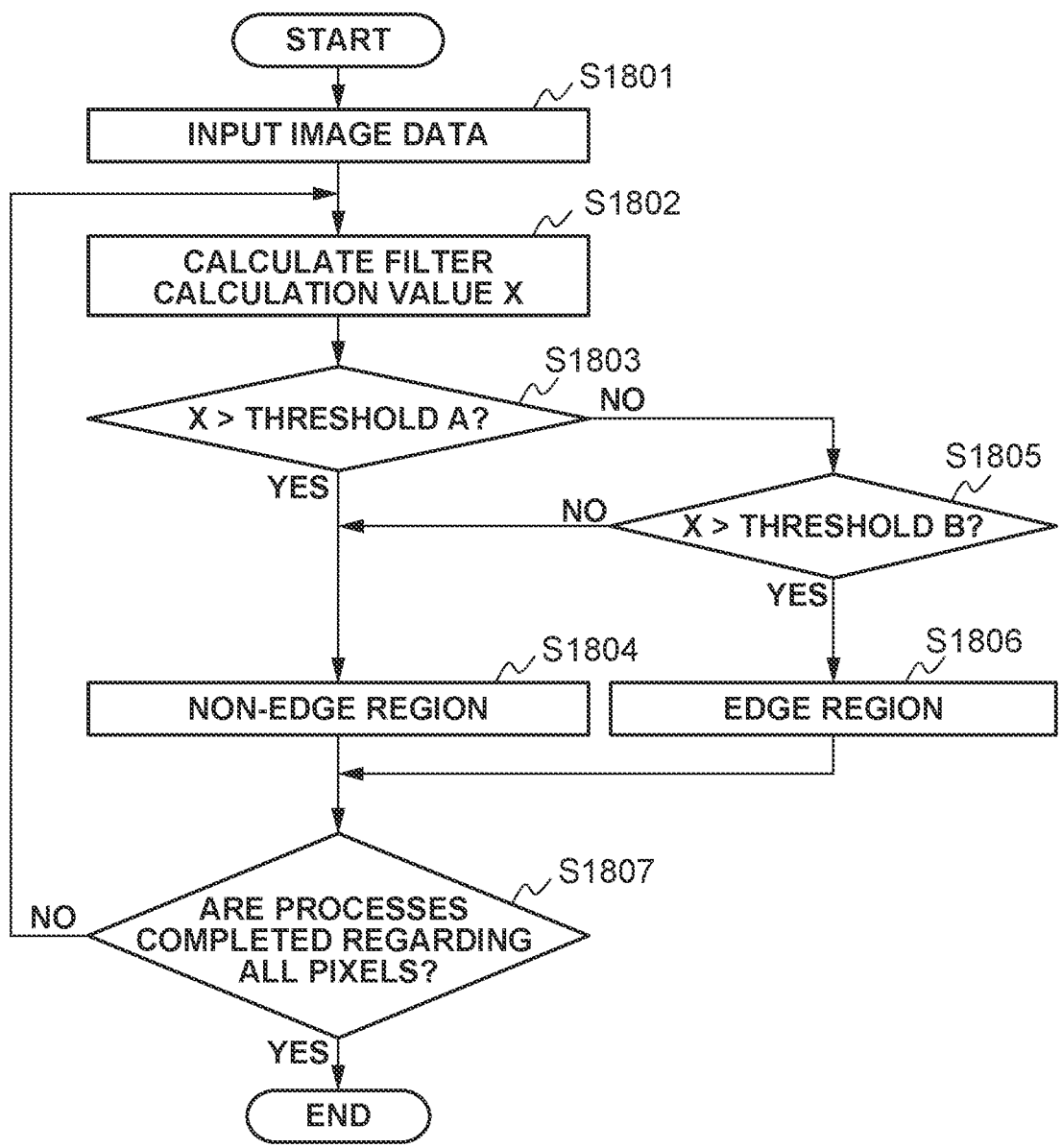
FIG. 18 is a specific flowchart of an edge detection process according to the first exemplary embodiment.

FIG. 18 is a flowchart illustrating the edge detection process in step S504. While the process is repeatedly performed on all the pixels rendered in step S502, the process on one pixel is illustrated in FIG. 18. First, in step S1801, image data is input. In step S1802, filter calculation is performed, thereby a calculation value X is calculated. The filter calculation process in step S1802 includes the following three steps. (1) As illustrated in FIG. 16A, the pixel values of 5×5 pixels centered at a processing target pixel are acquired. (2) The corresponding pixels are multiplied by 5×5 filter coefficients illustrated in FIG. 16B. (3) The values of the pixels in FIG. 16C as the 5×5 multiplication results are all added together, thereby the calculation value X is calculated.

In step S1803, it is determined whether the calculation value X exceeds a threshold A. The threshold A is a value equivalent to the threshold 1632 in FIG. 16D. If the determination result is yes (YES in step S1803), the processing proceeds to step S1804. If the determination result is no (NO in step S1803), the processing proceeds to step S1805. In step S1804, it is determined that the processing target pixel is included in the non-edge region. In step S1805, it is determined whether the calculation value X exceeds a threshold B. The threshold B is a value equivalent to the threshold 1633 in FIG. 16D.

If the determination result is yes (YES in step S1805), the processing proceeds to step S1806. If the determination result is no (NO in step S1805), the processing proceeds to step S1804. In step S1806, it is determined that the processing target pixel is included in the edge region. Then, the processing proceeds to step S1807. In step S1807, it is determined whether the filter calculation value calculation process in step S1802 and the determination processes in steps S1803 and S1805 are completed regarding all the pixels of the input image data. If the processes are not completed regarding all the pixels (NO in step S1807), the processing returns to step S1802. If the processes are completed regarding all the pixels (YES in step S1807), the processing returns to FIG. 5 and proceeds to step S505.

In step S505, image processing for obtaining image data in a format that can be recorded by the printer 407 is performed. In this step, the image data generated in step S504 is converted into image data compatible with a color gamut of the printer 407.

In the present exemplary embodiment, the input image data is data indicating color coordinates (R, G, B) in a color space coordinate system such as sRGB, which defines representation colors of a monitor. Then, the red (R), green (G), and blue (B) input image data using 8 bits for each color is converted into image data (R', G', B') in the color gamut of the printer 407 by a known technique such as a matrix calculation process or a process using a three-dimensional lookup table (LUT).

Next, the R', G', and B' image data using 8 bits for each color is converted into image data composed of color signal data corresponding to respective ink colors used by the printer 407. The printer 407 according to the present exemplary embodiment records an image using black (K), cyan (C), magenta (M), and yellow (Y) inks. Thus, the image data composed of R, G, and B signals is converted into image data composed of K, C, M, and Y color signals and using 8 bits for each color. The color conversion is performed using a three-dimensional LUT and interpolation calculation in combination. As another conversion technique, similarly to the above, a technique such as a matrix calculation process may be used. The number of ink colors is not limited to four, namely K, C, M, and Y. A form may be employed in which another type of ink such as a light cyan (Lc), light magenta (Lm), or gray (Gy) ink having a low density, a transparent ink, or a spot color ink may further be included.

Next, the process of adjusting the number of dots to be recorded on the recording medium through correction of the image data using 8 bits for each color is performed. The adjustment is made because the relationship between the number of dots to be applied to the recording medium and the optical density reproduced on the recording medium by the number of dots is not linear and therefore is converted into a linear relationship. As a method for converting input data into output data in the adjustment process, a one-dimensional LUT can be used.

Next, a quantization process is performed on the image data using 8 bits and 256 values for each ink color. By the quantization process, 1-bit binary data indicating recording "1" or non-recording "0" is generated for each pixel. The output of the quantization process is not limited to the 1-bit binary data indicating the recording "1" or the non-recording "0", and may be the number of ink droplets per certain unit area. A form may be employed in which the image data is quantized into multi-valued data of two or more bits. While an error diffusion method or a dithering method is known as the method of the quantization process, any method may be used.

Then, ink is applied based on the image data generated in step S505, thereby an image is recorded on the recording medium.

Figure 6:
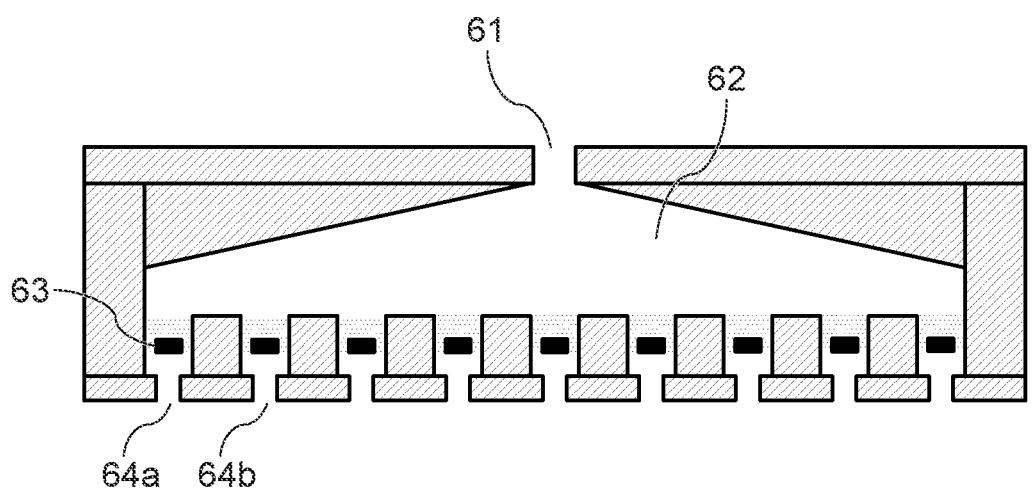
FIG. 6 is a cross-sectional view of an ink flow path indicating a flow of ink in the recording head.

Next, with reference to FIG. 6, discharge stability of the recording head 303 is described. FIG. 6 is a schematic cross-sectional view of an ink flow path indicating a flow of ink as a liquid in the recording head 303. An ink tank (not illustrated) supplies ink to a common liquid chamber 62 through an ink supply port 61. A nozzle 64a is filled with the ink supplied to the common liquid chamber 62 through a flow path. Then, a voltage is applied to a heater 63 as a recording element provided in an upper portion of the nozzle 64a, whereby bubbles are generated, and an ink droplet is discharged from the nozzle 64a.

While much of the energy caused by the bubble generation is converted into the discharge of the ink droplet, part of the energy is propagated from the nozzle 64a to the common liquid chamber 62. The propagated energy vibrates the ink in the common liquid chamber 62 and also influences the meniscus vibration of the ink filling a nozzle 64b adjacent to the nozzle 64a. In a head configuration in which ink is supplied from the common liquid chamber 62 to the nozzle 64a and the nozzle 64b adjacent to the nozzle 64a, the ink inside the nozzle 64b vibrates due to a discharge operation for discharging an ink droplet from the nozzle 64a. As a result, a discharge operation for discharging ink from the nozzle 64b becomes unstable. The issue with regard to discharge stability arises in a case where ink is continuously discharged, and does not arise at an initial discharge of ink or in a case where ink is discharged after a lapse of time greater than or equal to a certain time from a previous discharge.

FIGS. 7A and 7B are diagrams illustrating a case where landing positions of ink on a recording medium are shifted due to such a decrease in the discharge stability. FIG. 7A illustrates a case where ink droplets are landed at ideal positions. FIG. 7B illustrates a case where the landing positions of ink droplets are shifted under the influence of the discharge operations of an adjacent nozzle. In FIG. 7B, the widths of recorded regions are wider than the widths of the regions on image data due to the shifts in the landing positions. Particularly, as in a barcode image, in a case where a space region between the regions is represented by a margin region where ink is not applied, the space region is narrowed by widening of the widths of the regions as illustrated in FIG. 7B compared to a case where ink droplets are ideally landed as illustrated in FIG. 7A. If the above-described landing shifts occur in recording targets adjacent to a space region having a narrow width, the space region may be crushed. The characteristic configuration of the present exemplary embodiment for solving such an issue is described below.

Description of Recording Control

FIG. 8A is a diagram illustrating the number of ink droplets to be applied per unit area when the 1-bit binary data indicating recording "1" or non-recording "0" is input. As illustrated in FIG. 8A, two patterns A and B are prepared. In the non-edge region of a bar of a barcode image, it is defined that in the case of recording "1", one dot is recorded in both of the patterns A and B. On the other hand, in the edge region of the bar of the barcode image, it is defined that, in the case of recording "1", one dot is recorded in one of the patterns A and B and 0 dots are recorded, i.e., a dot is not recorded, in the other pattern.

FIG. 8B illustrates the patterns assigned to input image data. Based on the patterns, it is possible to control which of the patterns A and B is to be assigned to an input value. In the present exemplary embodiment, the patterns and the pitches between nozzles are synchronized with each other, whereby it is possible to perform control to prevent two adjacent nozzles from simultaneously discharging ink to a target region. Even if the value of the binary data indicates recording "1", ink is not discharged to a pixel assigned the pattern B. In other words, to an edge region, ink is discharged only from odd-numbered nozzles, and ink is restricted from being discharged from even-numbered nozzles.

Figure 9:
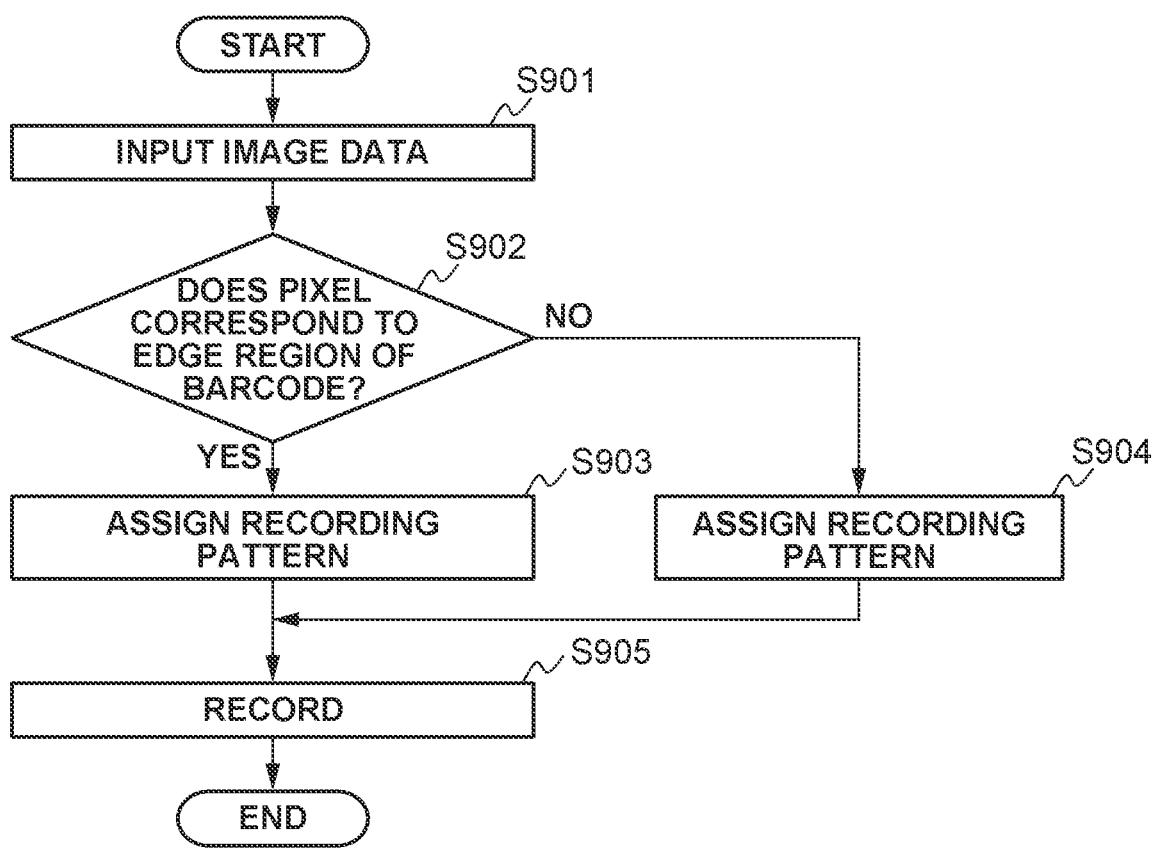
FIG. 9 is a flowchart for improving discharge stability according to a first exemplary embodiment.

FIG. 9 is a flowchart of processing in which a recording control unit records image data.

In step S901, image data in a binary data format and information indicating an edge region of a detected barcode are input.

In step S902, it is determined whether each pixel corresponds to the edge region of the detected barcode.

In steps S903 and S904, the recording patterns are assigned as illustrated in FIGS. 8A and 8B, and the number of ink droplets to be applied per unit area is determined. As a result, in the non-edge region of the barcode, one dot is applied to a pixel indicating recording "1", but in the edge region of the barcode, there may be a pixel to which a dot is not applied even if the pixel indicates recording "1".

Finally, in step S905, recording based on the assigned number of ink droplets is performed, and thereby ink is applied.

Figure 10:
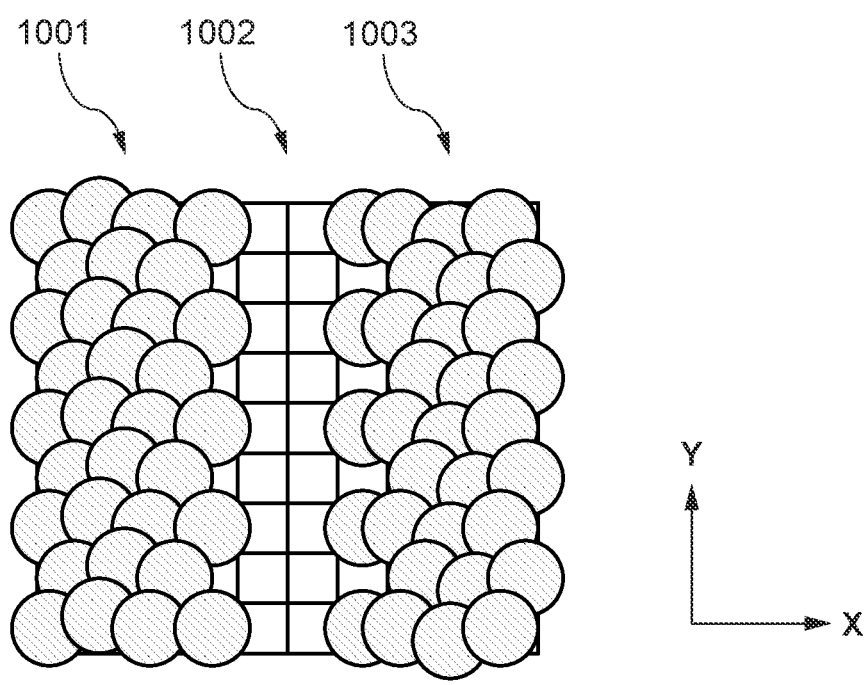
FIG. 10 is a diagram illustrating a barcode in which landing accuracy of ink is improved in the first exemplary embodiment.

FIG. 10 is a diagram illustrating dot placement of a barcode recorded on a recording medium. Two nozzles adjacent in the vertical direction in FIG. 10 are restricted from simultaneously discharging ink to edge regions of bar regions 1001 and 1003.

As described above, in a case where two adjacent nozzles simultaneously discharge ink in the inkjet recording apparatus, the discharge becomes unstable, and landing accuracy decreases. To deal with this, the simultaneous discharge from the two adjacent nozzles is restricted, whereby it is possible to stabilize the discharge and prevent the decrease in the landing accuracy. Landing shifts in edge regions of recording regions are thus prevented, whereby it is possible to prevent the crush of a space region 1002 located between two recording regions and formed by a blank space.

Figure 17:
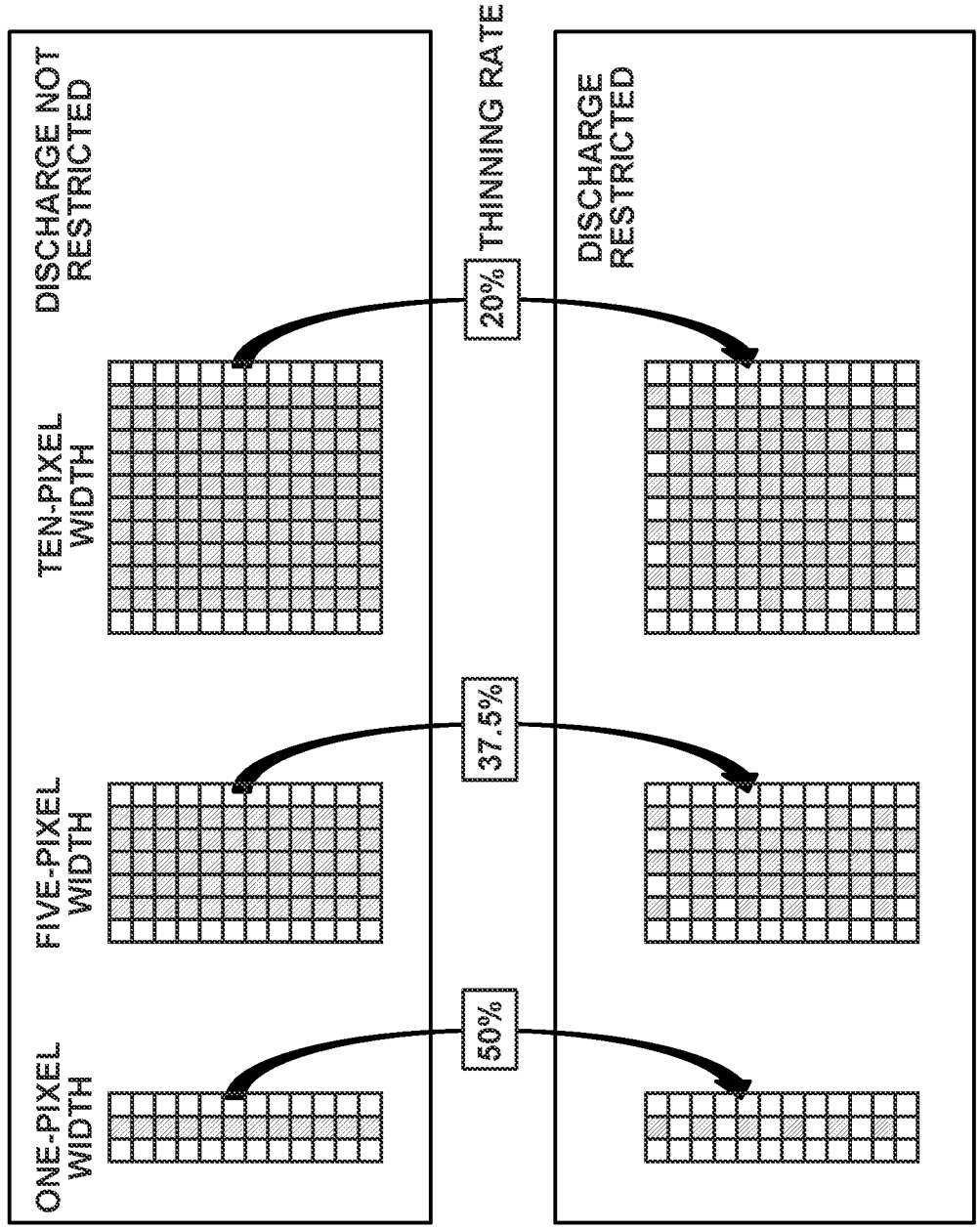
FIG. 17 is a diagram illustrating changes in a thinning amount when a width of a recording target increases.

FIG. 17 is a diagram illustrating the influence of the width of a recording region and the simultaneous discharge restriction process on the density of an image. FIG. 17 illustrates the density of an image in a case where a 50% discharge restriction is uniformly placed on an edge region regardless of the line width of a recording region. The wider the width of the region is, the smaller the change in the density of the recording region due to thinning of pixels in the edge region is. Meanwhile, there is an issue that if the discharge restriction process is performed on a one-pixel width region, since 50% of the pixels are thinned, a decrease in the density is great. Thus, in the present exemplary embodiment, a recording region having the one-pixel width (an independent edge region) is treated similarly to a non-edge region, and the simultaneous discharge restriction process for restricting the simultaneous discharge from two adjacent nozzles is not performed on the edge region thereof. Consequently, in a recording region where a decrease in the density due to the simultaneous discharge restriction process is great as in a one-pixel width line, it is possible to maintain the density as the simultaneous discharge restriction process is not performed.

In the present exemplary embodiment, as the configuration for restricting the simultaneous discharge from two adjacent nozzles, the binary recording data indicating whether to apply ink is changed, but a similar effect can also be obtained by another method. For example, when the image processing apparatus adjusts the number of dots to be recorded on the recording medium using a one-dimensional LUT in step S505, a method for switching the one-dimensional LUT to an LUT different in values after the adjustment based on information regarding whether each pixel corresponds to an edge region may be employed. Alternatively, when the quantization process is performed, a method for performing the quantization process so that a pixel corresponding to one of two adjacent nozzles indicates non-recording "0" based on the information regarding whether each pixel corresponds to an edge region may be employed.

In the present exemplary embodiment, as the edge information regarding the barcode, the edge region and the non-edge region are detected. If a region other than the barcode is also an edge region, it is desirable to perform a process similar to that performed on the edge region of the barcode on the region. In other words, the simultaneous discharge from two adjacent nozzles to the edge region is restricted, and the simultaneous discharge from two adjacent nozzles to another region is not restricted.

In the present exemplary embodiment, an edge region of the barcode is extracted using the edge detection filter, and the simultaneous discharge from two adjacent nozzles to the edge region is restricted. If a barcode is the recording target, it is not necessary to restrict the simultaneous discharge to the entirety of the edge region. The issue raised in the present disclosure is, in a case where a barcode is the recording target, bleeding of ink in an edge region extending in the Y-direction, which is the direction in which the plurality of nozzles is arranged. Thus, a form may be employed in which only an edge region of a barcode composed of bars extending in the Y-direction, i.e., bars and spaces whose lengths in the Y-direction are longer than the lengths in the X-direction, is detected. An issue in reading due to bleeding does not arise in an edge region in the X-direction. Thus, a form may be employed in which only the sides extending in the Y-direction (the vertical direction in FIGS. 7A and 7B) in each bar are detected as the edge region.

In the example illustrated in FIGS. 8A and 8B, control is performed so that ink is discharged from the odd-numbered nozzles, which are assigned the pattern A, and ink is not discharged from the even-numbered nozzles, which are assigned the pattern B. Thus, with regard to ink to be simultaneously discharged from two adjacent nozzles, the rate of ink to be discharged from the odd-numbered nozzle is 100%, and the rate of ink to be discharged from the even-numbered nozzle is 0%. As described above, the rate of ink to be discharged from one of the odd-numbered nozzle and the even-numbered nozzle may not be 0% if the influence of the simultaneous discharge can be reduced. Ink may be discharged from the even-numbered nozzle. In the present exemplary embodiment, the rate of ink to be discharged from the odd-numbered nozzle to the non-edge region is 100%, the rate of ink to be discharged from the even-numbered nozzle to the non-edge region is 100%, and the difference between the rates is 0%. On the other hand, the rate of ink to be discharged from the odd-numbered nozzle to the edge region is 100%, the rate of ink to be discharged from the even-numbered nozzle to the edge region is 0%, and the difference between the rates is 100%. It is desirable that the difference between the rates of ink to be discharged from two adjacent nozzles to the edge region be greater than the difference between the rates of ink to be discharged from two adjacent nozzles to the non-edge region. The relationship between the odd-numbered nozzle and the even-numbered nozzle may be reversed, and a form may be employed in which more ink is discharged from the even-numbered nozzle to the edge region.

While in the present exemplary embodiment, a line having a one-pixel width in the scanning direction of the recording head is detected by a comparison between the filter calculation value and the thresholds, the detection method is not limited to the above-described method. For example, a method for detecting an edge using an attribute value accompanying an object of image data may be employed. The method for detecting the line width is not limited to the above-described method, either. A threshold for determining that the simultaneous discharge from two nozzles adjacent in the nozzle arrangement direction is to be restricted is not limited to whether the width in the scanning direction of the recording head is one pixel, and a form may be employed in which the threshold is determined based on whether the width is greater than the number of pixels determined in advance. The threshold can be appropriately determined depending on the extent of the influence of discharge instability.

In the above-described exemplary embodiment, the discharge of ink to pixels in the same column arranged in the nozzle arrangement direction (the Y-direction in the figures) on the recording medium is defined as simultaneous discharge, and the simultaneous discharge from two adjacent nozzles is restricted from being performed. The extent of the influence of the vibration of ink from an adjacent nozzle differs depending on a driving frequency of the recording head or a composition of the ink. Thus, the restriction on the discharge from adjacent nozzles for recording corresponding to one pixel in the X-direction alone may not solve the issue.

To deal with this, in a second exemplary embodiment, an example is described where the simultaneous discharge from nozzles in a pixel range that influences discharge operations is restricted.

An example is described where the discharge instability due to the vibration of ink through the common liquid chamber influences a position two pixels away on a recording medium. Specifically, the second exemplary embodiment is different from the first exemplary embodiment in the edge detection process in step S504 in FIG. 5 and similar to the first exemplary embodiment in the processes of steps S501 to S503. Thus, the similar portions are not described.

Figure 19:
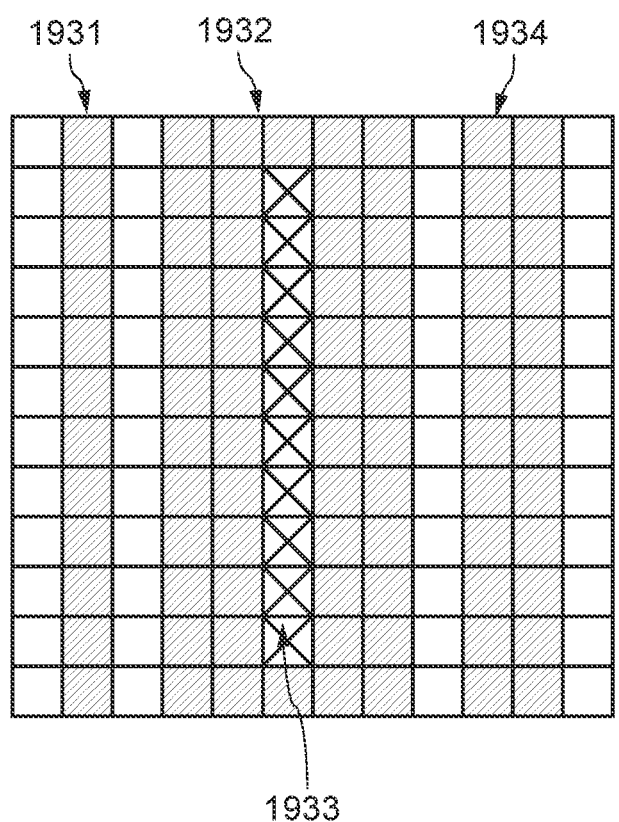
FIG. 19 is a diagram illustrating a case where two pixels from an end portion of a region are defined as an edge region.

FIG. 19 illustrates an independent edge region 1931, edge regions 1932 and 1934, and a non-edge region 1933 that are detected by the edge detection unit in the present exemplary embodiment. The independent edge region 1931 is a region having short sides that are one pixel. Similarly to the above-described exemplary embodiment, the simultaneous discharge restriction is not placed on an independent edge region as in a non-edge region.

FIGS. 20A to 20D are diagrams illustrating the process of detecting an edge region by a filter process.

Similarly to FIGS. 16A to 16D, FIG. 20A illustrates input image data and an image of a vertical ruled line having a one-pixel width in the horizontal direction. FIG. 20B illustrates an edge detection filter. FIG. 20C illustrates a result of calculation using the edge detection filter. FIG. 20D illustrates a diagram plotting the result of calculation using the filter on a vertical axis 2000. FIG. 20D illustrates the results of calculation using the filter in FIG. 20B regarding a one-pixel width vertical ruled line 2001, a two-pixel width vertical ruled line 2002, a three-pixel width vertical ruled line 2003, a four-pixel width vertical ruled line 2004, and a five-pixel width vertical ruled line 2005.

Figure 20:
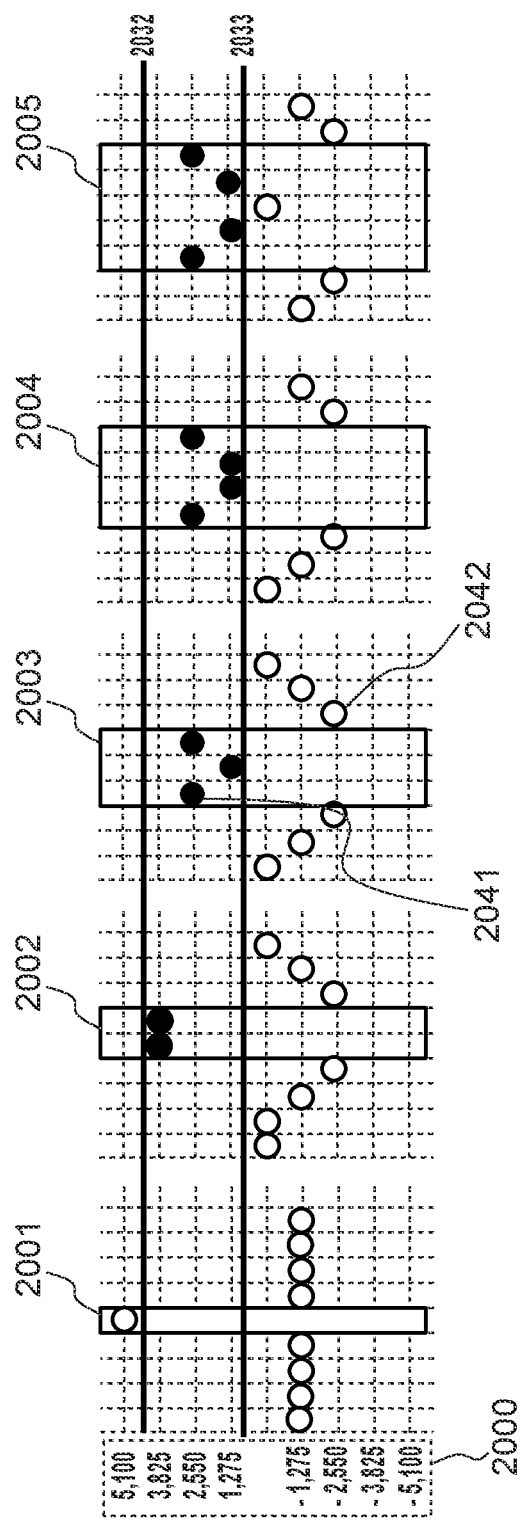
FIGS. 20A, 20B, 20C, and 20D are diagrams illustrating determinations of an edge region and a non-edge region by a filter process according to the second exemplary embodiment.

In the present exemplary embodiment, as illustrated in FIG. 20D, an edge region corresponds to two pixels from an end portion of a recording region. Thresholds 2032 and 2033 are set, and a pixel in a range between the thresholds 2032 and 2033 is detected as the edge region. A black circle 2041 indicates a pixel determined as the edge region. A white circle 2042 indicates a pixel determined as the non-edge region.

Figure 21:
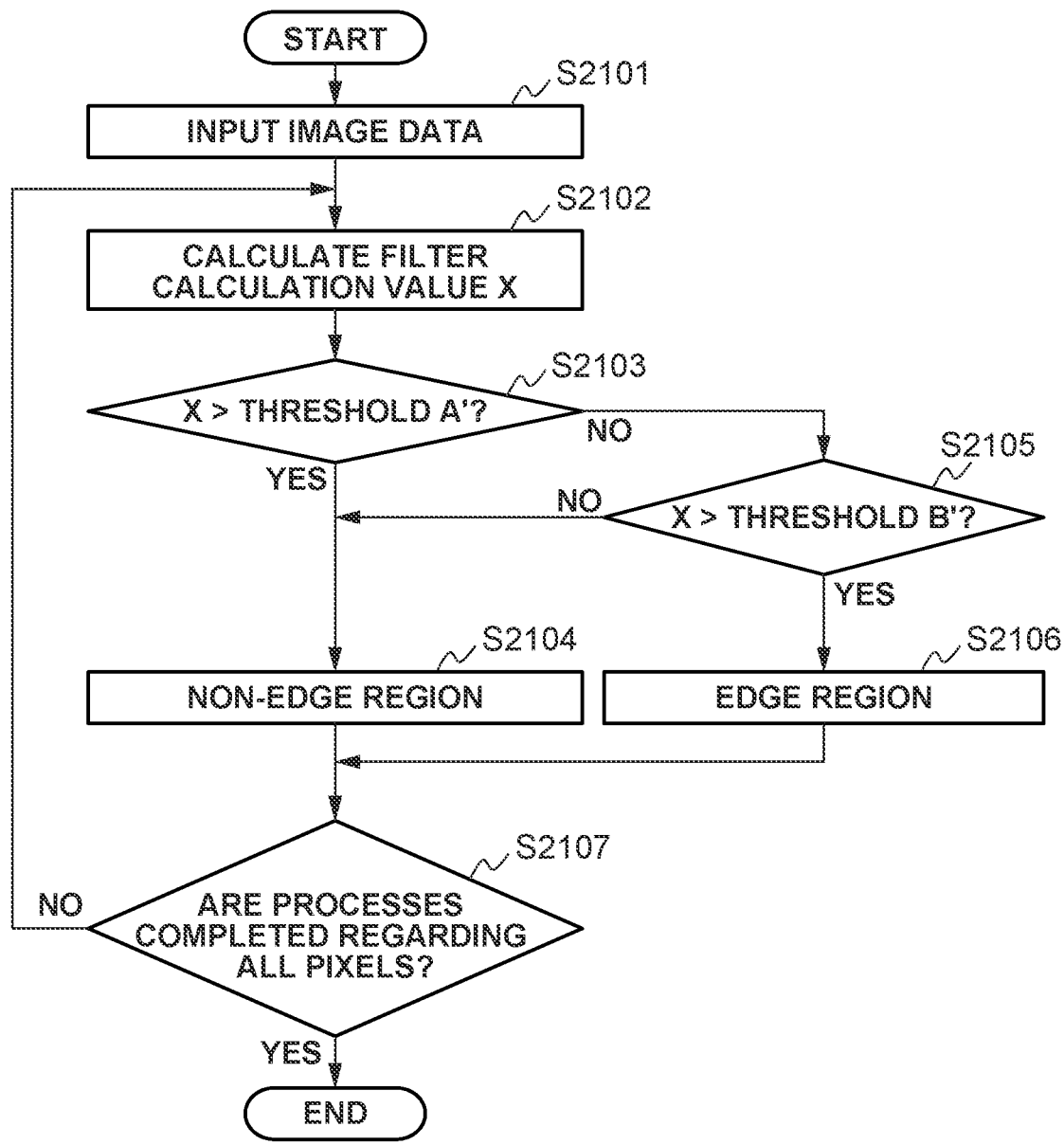
FIG. 21 is a specific flowchart of an edge detection process according to the second exemplary embodiment.

FIG. 21 is a flowchart illustrating the edge detection process according to the present exemplary embodiment.

While the process is repeatedly perform on all the pixels rendered in step S502, the process on one pixel is illustrated in FIG. 21. First, in step S2101, image data is input. In step S2102, filter calculation is performed, thereby a calculation value X is calculated. The filter calculation process in step S2102 includes the following three steps. (1) As illustrated in FIG. 20A, the pixel values of 5×5 pixels centered at a processing target pixel are acquired. (2) The corresponding pixels are multiplied by 5×5 filter coefficients illustrated in FIG. 20B. (3) The values of the pixels in FIG. 20C as the 5×5 multiplication results are all added together, thereby the calculation value X is calculated.

In step S2103, it is determined whether the calculation value X exceeds a threshold A'. The threshold A' is a value equivalent to the threshold 2032 in FIG. 20D. If the determination result is yes (YES in step S2103), the processing proceeds to step S2104. If the determination result is no (NO in step S2103), the processing proceeds to step S2105.

In step S2104, it is determined that the processing target pixel is included in the non-edge region.

In step S2105, it is determined whether the calculation value X exceeds a threshold B'. The threshold B' is a value equivalent to the threshold 2033 in FIG. 20D. If the determination result is yes (YES in step S2105), the processing proceeds to step S2106. If the determination result is no (NO in step S2105), the processing proceeds to step S2104. In step S2106, it is determined that the processing target pixel is included in the edge region. Then, the processing proceeds to step S2107.

In step S2107, it is determined whether the filter calculation value calculation process in step S2102 and the determination processes in steps S2103 and S2105 are completed regarding all the pixels of the input image data. If the processes are not completed regarding all the pixels (NO in step S2107), the processing returns to step S2102. If the processes are completed regarding all the pixels (YES in step S2107), the processing returns to FIG. 5 and proceeds to step S505. The process of step S505 is similar to that in the first exemplary embodiment, and therefore is not described.

As described above, in the present exemplary embodiment, the simultaneous discharge from nozzles in a pixel range to be influenced by the discharge instability due to the vibration of ink through the common liquid chamber is restricted, whereby it is possible to record a recorded product in which the width of a recording target region is a width desired by the user. While a description has been given of the example where the discharge instability influences a position two pixels away on the surface of a recording medium, the present disclosure is not limited to two pixels.

It is desirable to appropriately set a range of the number of pixels depending on the degree of the influence. A line having the width less than or equal to a predetermined number of pixels is defined as an independent edge region, and the independent edge region is treated as equivalent to the non-edge region on which the discharge restriction is not placed, whereby it is possible to appropriately place the discharge restriction on only a pixel in which the discharge restriction is necessary.

In the first and second exemplary embodiments, the independent edge region having the width less than or equal to a predetermined pixel width is regarded as equivalent to the non-edge region and subjected to the same process. Regarding the independent edge region, however, there is an issue that not only does the density decrease, but also the shape changes. In a third exemplary embodiment, an example is described where both a decrease in the density and a change in the shape of an independent edge region are taken into account.

In the present exemplary embodiment, the independent edge region 1531 in FIG. 15 is treated as a region different from the non-edge region 1533. The processes of steps S501 to S503 are not described, and the edge detection process in step S504 is described.

FIG. 22 is a flowchart illustrating the edge detection process according to the present exemplary embodiment. While the process is repeatedly performed on all the pixels rendered in step S502, the process on one pixel is illustrated in FIG. 22. First, in step S2201, image data is input. In step S2202, filter calculation is performed, thereby a calculation value X is calculated. Three steps in the filter calculation process in step S2202 are similar to those in the above-described exemplary embodiments.

In step S2203, it is determined whether the calculation value X exceeds a threshold A".

If the determination result is yes (YES in step S2203), the processing proceeds to step S2204. If the determination result is no (NO in step S2203), the processing proceeds to step S2205. In step S2204, it is determined that the processing target pixel is included in the independent edge region. Then, the processing proceeds to step S2208.

In step S2205, it is determined whether the calculation value X exceeds a threshold B" (<the threshold A"). If the determination result is yes (YES in step S2205), the processing proceeds to step S2206. If the determination result is no (NO in step S2205), the processing proceeds to step S2207. In step S2206, it is determined that the processing target pixel is included in the edge region. In step S2207, it is determined that the processing target pixel is included in the non-edge region.

In step S2208, if it is determined that the determination processes are completed regarding all the pixels of the input image data (YES in step S2208), the processing returns to FIG. 5 and proceeds to step S505.

In the process of step S505, the processing regarding the edge region and the non-edge region is similar to that in the above-described exemplary embodiments, and therefore is not described. The pixels determined as being included in the independent edge region are described. A configuration is described in which the decrease in the density is reduced as much as possible while the influence of the simultaneous discharge is reduced to an acceptable range, compared to the first exemplary embodiment.

In the present exemplary embodiment, the rate of ink to be discharged from the odd-numbered nozzle to the non-edge region is 100%, the rate of ink to be discharged from the even-numbered nozzle to the non-edge region is 100%, and the difference between the rates is 0%. On the other hand, the rate of ink to be discharged from the odd-numbered nozzle to the edge region is 100%, the rate of ink to be discharged from the even-numbered nozzle to the edge region is 0%, and the difference between the rates is 100%. It is desirable that the difference between the rates of ink to be discharged from two adjacent nozzles to the independent edge region be greater than or equal to the difference between the rates of ink to be discharged from two adjacent nozzles to the non-edge region and less than or equal to the difference between the rates of ink to be discharged from two adjacent nozzles to the edge region.

With regard to control over discharge nozzles for the independent edge region, the rate of ink to be discharged from one of the odd-numbered nozzle and the even-numbered nozzle may not be 0% if the influence of the simultaneous discharge can be reduced to an acceptable range. In other words, as the difference between the rates of ink to be discharged from two adjacent nozzles to the independent edge region is brought closer to 0%, the density is maintained better. As the difference between the rates of ink to be discharged from two adjacent nozzles to the independent edge region is brought closer to 100%, the shape is maintained better.

For example, if the difference between the rates of ink to be discharged from two adjacent nozzles to the independent edge region is brought close to 50%, it is possible to achieve a balance between the prevention of a decrease in the density and the maintenance of the shape.

As described above, different processes are performed on the independent edge region and the non-edge region, whereby it is possible to achieve both the prevention of a decrease in the density of the independent edge region and the prevention of a change in the shape of the independent edge region.

In a fourth exemplary embodiment, components different from those in the first exemplary embodiment are described. Components similar to those in the first exemplary embodiment are designated by the same signs, and are not described in detail. Only the differences from the first exemplary embodiment are described in detail.

In the first exemplary embodiment, an edge region is detected, two adjacent nozzles are restricted from simultaneously discharging ink in a single scan to increase the discharge stability, and what is called one-pass recording that completes recording of a target image by a single scan is performed. In the present exemplary embodiment, a configuration is described in which image data is divided into multiple scans, and the recording of a target image is completed by what is called multipass recording that records an image by multiple scans.

Figure 11A:
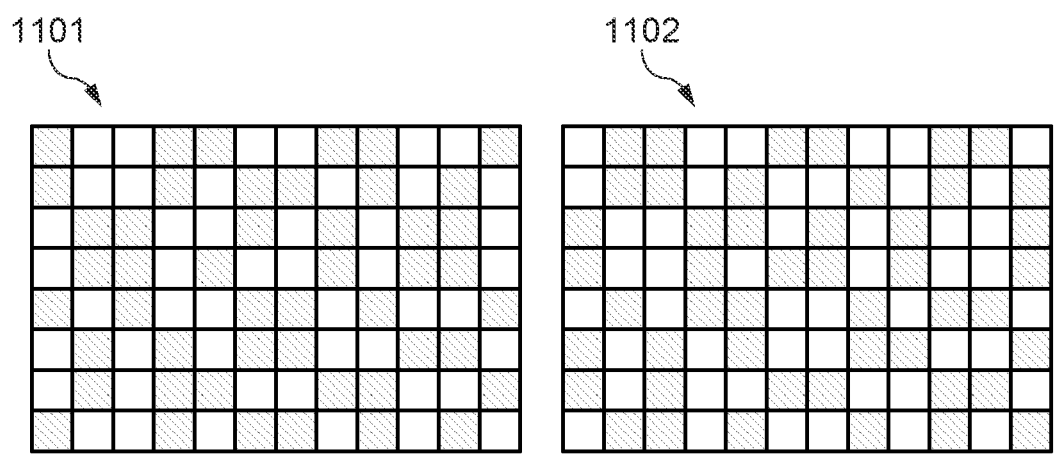
FIGS. 11A and 11B are diagrams illustrating examples of pass masks used to divide image data into two and record the image data by two scans.
Figure 11B:
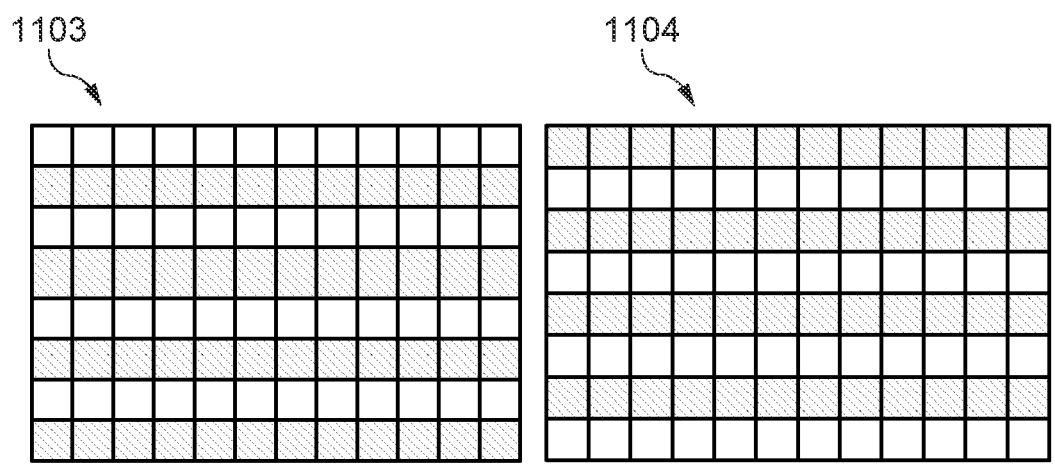

FIGS. 11A and 11B are diagrams illustrating pass masks used to divide image data when the image data is recorded by two scans. FIG. 11A illustrates a pass mask used for a non-edge region. FIG. 11B illustrates a pass mask used for an edge region. A pixel indicated by oblique lines is set as a recording pixel in which ink is allowed to be applied in the scan. A white pixel is set as a non-recording pixel in which ink is not allowed to be applied. The two masks have an exclusive relationship, and recording can be performed in all the pixels by two scans.

In FIG. 11A, when the first scan is performed on the non-edge region of a barcode, recording is performed based on recording data generated using a mask 1101. When the second scan is performed, recording is performed based on recording data generated using a mask 1102. In FIG. 11B, when the first scan is performed on the edge region, recording is performed based on recording data generated using a mask 1103. When the second scan is performed thereon, recording is performed based on recording data generated using a mask 1104. Recording pixels and non-recording pixels in each of the masks are arranged to prevent the simultaneous discharge from two adjacent nozzles in the recording of each of the scans on the edge region.

Figure 12:
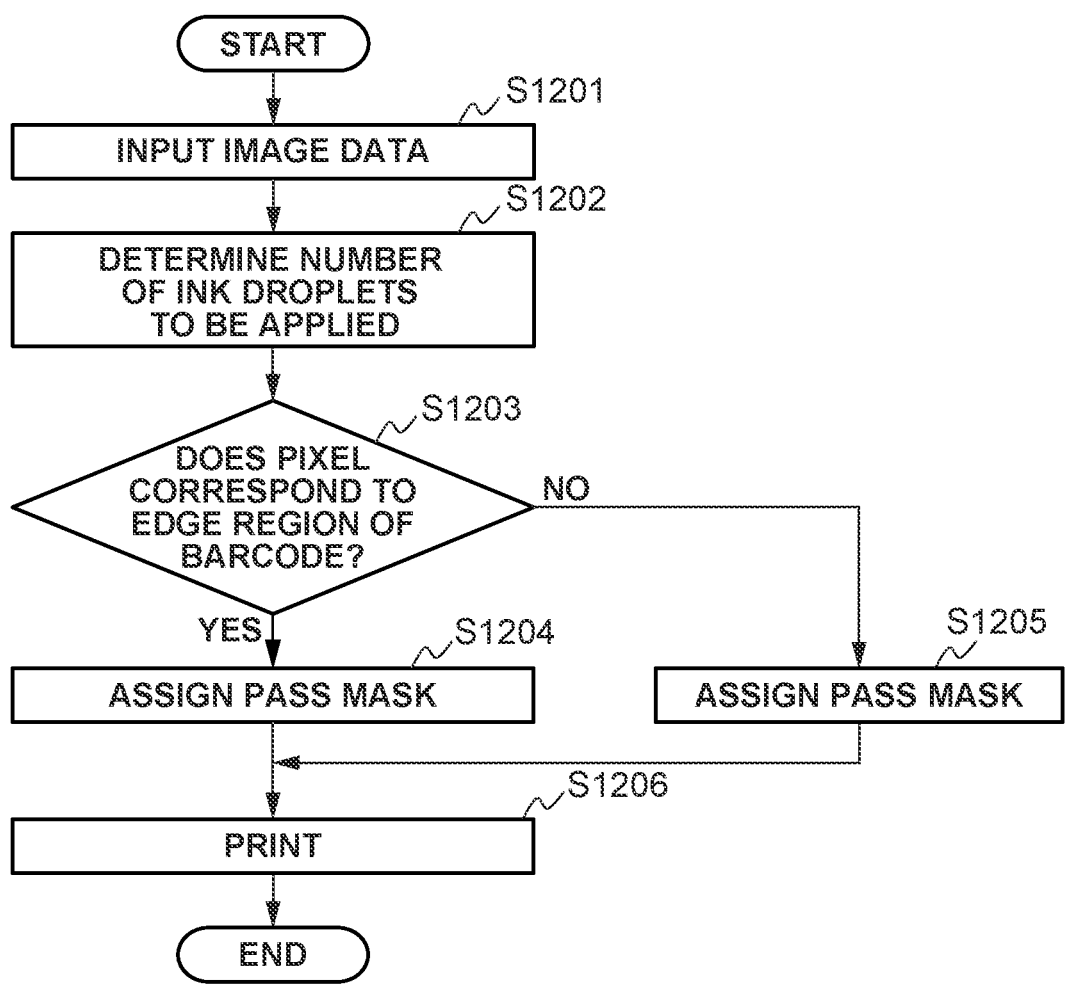
FIG. 12 is a flowchart for improving discharge stability according to a second exemplary embodiment.

FIG. 12 is a flowchart of the process of recording image data according to the present exemplary embodiment.

In step S1201, image data in a binary data format and information indicating a detected edge region are input.

In step S1202, the number of ink droplets to be applied per unit area is determined. In the present exemplary embodiment, one dot is applied to a pixel indicating recording "1" regardless of whether the pixel is in the edge region or the non-edge region.

In step S1203, it is determined whether each pixel corresponds to the edge region.

In steps S1204 and S1205, a pass mask is assigned to the binary data. By the process, the pass mask set to prevent the simultaneous discharge from two adjacent nozzles from being performed in the same scan is assigned to the edge region.

Finally, in step S1206, an image is recorded based on pieces of recording data corresponding to the two scans.

In the present exemplary embodiment, the pass mask is used in which the recording pixels and the non-recording pixels are arranged to prevent the simultaneous discharge from two adjacent nozzles to the edge region from being performed in a single scan. The simultaneous discharge from two adjacent nozzles is restricted from being performed, whereby a discharge operation for discharging ink from each nozzle stabilizes, and it is possible to prevent a decrease in the landing accuracy.

Image data is divided into multiple scans and recorded, whereby, even if the simultaneous discharge from two adjacent nozzles is restricted, it is possible to maintain the total number of dots to be applied to a recording medium. Thus, it is possible to stabilize the discharge without decreasing a density desired by the user.

While in the present exemplary embodiment, a description has been given of a configuration in which image data is divided into two scans and an image including a target is recorded by the two scans, the present disclosure is similarly applicable to a configuration in which image data is divided into three or more scans, and the image including a target is recorded by the three or more scans. In other words, the simultaneous discharge from two adjacent nozzles in a single scan is controlled, whereby it is possible to obtain the discharge stability of ink and a high-quality image.

In the above-described exemplary embodiments, a description has been given of a method for restricting the simultaneous discharge from two adjacent nozzles to maintain the discharge stability. Depending on nozzle intervals or a flow path length to a liquid chamber in the recording head, the vibration of ink through the common liquid chamber may influence the discharge operations of nozzles two or more nozzles away. In the present disclosure, a form may be employed in which the simultaneous discharge is restricted from nozzles in a range in which the discharge operations of the nozzles are influenced.

Figure 13:
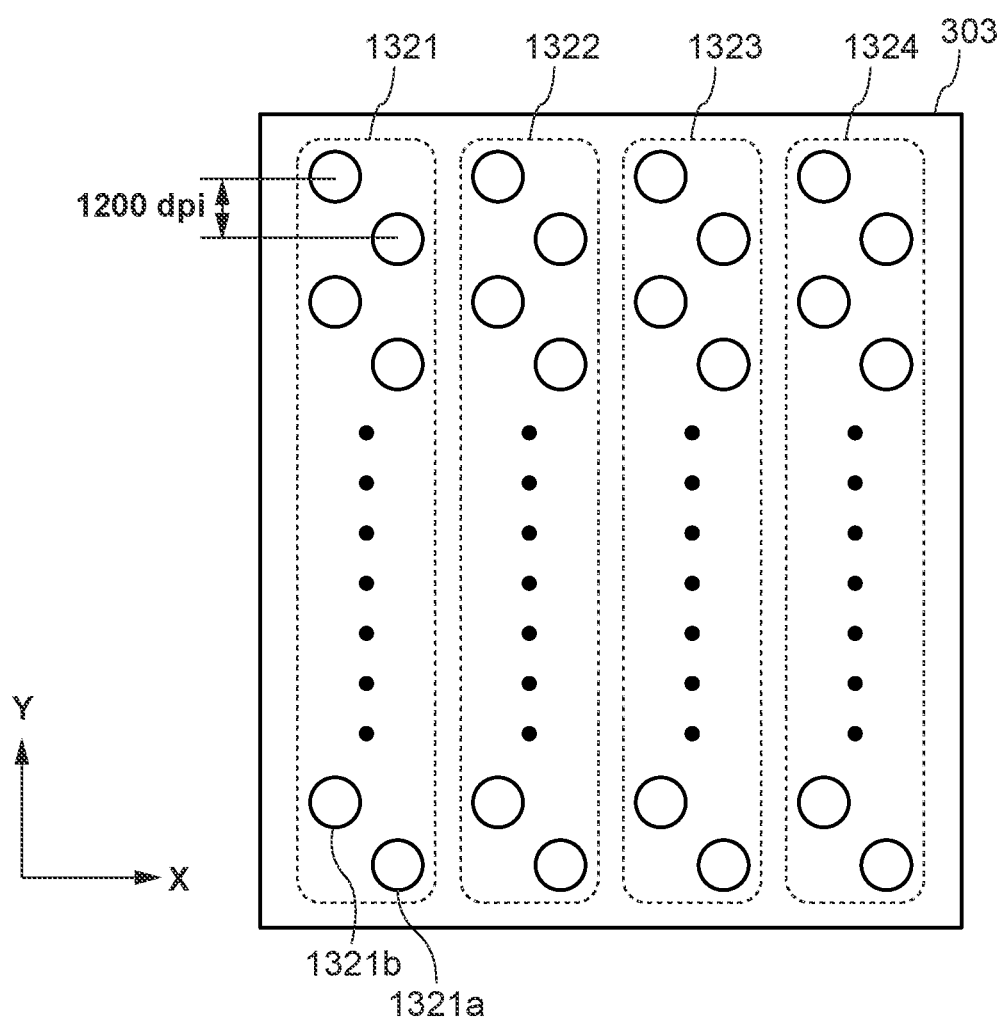
FIG. 13 is a schematic diagram illustrating a case where a recording head is observed from a nozzle formation surface.

A similar issue may arise in a configuration in which a plurality of nozzle columns is connected to a common liquid chamber. For example, as illustrated in FIG. 13, the present disclosure is also applicable to a recording head having a configuration in which a nozzle column composed of even-numbered nozzles and a nozzle column composed of odd-numbered nozzles are connected to a common liquid chamber and arranged to be shifted in the X-direction. At this time, it is considered that the simultaneous discharge of ink influences discharge operations for discharging ink from two adjacent nozzles on the common liquid chamber. For example, if ink is supplied from a single common liquid chamber to two nozzle columns included in a nozzle group 1321, it is considered that the discharge operation of a nozzle 1321a influences the discharge operation of a nozzle 1321b. In other words, with regard to a plurality of nozzle columns to which ink is supplied from the same common liquid chamber, it is necessary to restrict the simultaneous discharge from two nozzles at positions adjacent in the Y-direction in FIG. 13 (the nozzles 1321a and 1321b in FIG. 13).

In the above-described exemplary embodiments, the description has been given of the recording head using a thermal method that uses an electrothermal conversion element as the recording element for discharging ink. Alternatively, a recording head using a piezoelectric method that applies a voltage to a piezoelectric element to change the volume of ink and discharges the ink may be employed.

In the above-described exemplary embodiments, the description has been given of the inkjet recording apparatus using what is called a serial recording method in which a recording head, in which a plurality of nozzles is arranged, scans in a direction intersecting the nozzle arrangement direction to record an image. The present disclosure is applicable to a form in which an image is recorded by a relative scan of a recording medium and a recording head. For example, embodiments of the present disclosure may be applied to an inkjet recording apparatus in what is called a full multi-format. In the inkjet recording apparatus in the full multi-format, a recording medium is conveyed in the direction intersecting the nozzle arrangement direction, and an image is recorded using a line head capable of recording the image by a single scan over the entire region of the width of the recording medium. In the case of the inkjet recording apparatus in the full multi-format, it is desirable to apply the above configuration to a barcode in which bars extend in the direction in which the nozzles are arranged.

While in the above-described exemplary embodiments, the description has been given on the assumption that the width of the edge region is one pixel, the number of pixels to be detected as the edge region may be two or more pixels. In this case, it is desirable to restrict the simultaneous discharge from two adjacent nozzles in a region corresponding to one pixel in the nozzle arrangement direction. In other words, it is desirable that the difference between the rates of ink to be discharged from two adjacent nozzles to the edge region be greater than the difference between the rates of ink to be discharged from two adjacent nozzles to the non-edge region.

Embodiments of the present disclosure can also be realized by a combination of the configurations of the above-described exemplary embodiments in which control is performed not to perform recording on a recording medium in a state where image data is divided into multiple scans to be recorded.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-043942, filed Mar. 18, 2022, which is hereby incorporated by reference herein in its entirety.

What is claimed is:

1. An inkjet recording apparatus comprising:
a recording unit in which a plurality of nozzles for discharging ink supplied from a common liquid chamber is arranged in a first direction;
a scan unit configured to perform a relative scan relative to a recording medium in a second direction intersecting the first direction; and
an acquisition unit configured to acquire image data including at least one recording target,
wherein, in a case where a width in the second direction of the recording target is a first number of pixels, the recording unit performs recording using a first nozzle but not a second nozzle adjacent to the first nozzle in the first direction in a single relative scan in an edge region of the recording target, and
wherein, in a case where the width in the second direction of the recording target is a second number of pixels smaller than the first number of pixels, the recording unit performs recording using the first and second nozzles in the single relative scan in the edge region of the recording target.

2. The inkjet recording apparatus according to claim 1,
wherein, in a case where the width in the second direction of the recording target is greater than a predetermined number of pixels, the recording unit performs recording using the first nozzle but not the second nozzle in a single relative scan in recording of an image in the edge region of the recording target, and
wherein, in a case where the width in the second direction of the recording target is less than or equal to the predetermined number of pixels, the recording unit performs recording using the first and second nozzles in a single relative scan in recording of the image in the edge region of the recording target.

3. The inkjet recording apparatus according to claim 2, wherein the predetermined number of pixels is one.

4. The inkjet recording apparatus according to claim 1, wherein the recording unit performs recording using the first and second nozzles in the single relative scan in a non-edge region contained in the edge region of the recording target.

5. The inkjet recording apparatus according to claim 1, wherein, in a case where the width in the second direction of the recording target is the first number of pixels, the recording unit performs recording using one of an odd-numbered nozzle and an even-numbered nozzle arranged in the first direction of the recording unit but not the other in the single relative scan in the edge region of the recording target.

6. The inkjet recording apparatus according to claim 1, further comprising a detection unit configured to detect the edge region of the recording target.

7. The inkjet recording apparatus according to claim 1, further comprising a determination unit configured to, based on a result of calculation using a filter, determine whether to use the first nozzle but not the second nozzle or to use the first and second nozzles in the single relative scan.

8. The inkjet recording apparatus according to claim 7, wherein the recording unit performs recording using the first nozzle but not the second nozzle in the single relative scan in a pixel in which a calculation value obtained by the calculation is greater than a first threshold and smaller than a second threshold, and performs recording using the first and second nozzles in the single relative scan in a pixel in which the calculation value is smaller than the first threshold and a pixel in which the calculation value is greater than the second threshold.

9. The inkjet recording apparatus according to claim 1, wherein the second number of pixels is one.

10. The inkjet recording apparatus according to claim 1, further comprising a generation unit configured to divide the image data using pass masks corresponding to multiple scans and generate recording data corresponding to each of the multiple scans, wherein the recording unit uses the second nozzle based on a setting regarding whether recording is allowed of each of the pass masks.

11. The inkjet recording apparatus according to claim 1, wherein the scan unit moves the recording unit in the second direction.

12. An inkjet recording method comprising:

acquiring image data including at least one recording target;

in a case where a width in a second direction of the recording target is a first number of pixels, in a single relative scan in the second direction by a recording unit in which a plurality of nozzles for discharging ink supplied from a common liquid chamber is arranged in a first direction intersecting the second direction, and a recording medium in an edge region of the recording target, performing recording using a first nozzle but not a second nozzle adjacent to the first nozzle in the first direction; and in a case where the width in the second direction of the recording target is a second number of pixels smaller than the first number of pixels, performing recording using the first and second nozzles in the single relative scan in the edge region of the recording target.

\* \* \* \* \*